Patented Oct. 17, 1950

2,525,774

UNITED STATES PATENT OFFICE 2,525,774

HEPTACHLOROTHIOLANE AND METHOD FOR PRODUCING THE SAME

Harry L. Coonradt, Woodbury, and Howard D. Hartough, Pitman, N. J., assignors to Socony-Vacuum Oil Company, Incorporated, a corporation of New York No Drawing. Application May 18, 1949, Serial No. 94,056

7 Claims. (Cl. 260—329)

This invention relates to a new composition of matter, namely, heptachlorothiolane, characterized by the molecular formula $C_4HCl_7S$ and by a freezing point of 14.6° C. The invention is further concerned with a method for synthesizing this new compound.

The direct reaction between thiophene and chlorine is well known in the art and proceeds easily and rapidly under normal conditions to yield a thiophene-chlorine reaction mixture comprising unreacted thiophene, monochlorothiophene, dichlorothiophene, trichlorothiophene, tetrachlorothiophene, and addition products of thiophene.

To obtain a clear-cut separation of the various chlorothiophenes, the method developed over sixty years ago, and accredited to Victor Meyer, has heretofore generally been employed. This method involves heating the crude chlorination reaction mixture with alcoholic potassium hydroxide for several hours, followed by addition of water and subsequent steam distillation and fractionation of the mixture so obtained to yield the various chlorothiophenes. The aforesaid treatment with alcoholic potassium hydroxide has heretofore destroyed the addition products of thiophene formed during the course of the chlorination reaction.

In accordance with the present invention, it has now been discovered that a new and useful chemical can be isolated from the reaction mixture of thiophene and chlorine. This new compound has been identified as heptachlorothiolane and is produced in accordance with the method of this invention by treating thiophene under controlled conditions of temperature with at least 5 moles of chlorine per mole of thiophene and thereafter fractionating the reaction product mixture so obtained to yield heptachlorothiolane. This new composition of matter containing reactive chlorine is capable of entering into a number of different chemical reactions and may serve as an intermediate in the synthesis of compounds suitable for use in the pharmaceutical, dye and allied industries.

The process of this invention comprises chlorination of thiophene employing a molar ratio of chlorine to thiophene of at least 5:1, and preferably higher, to yield a new composition of matter, namely, heptachlorothiolane, which can be separated from the chlorinated by-products present by fractionation, preferably under reduced pressure. In its preferred aspects, the present invention comprises the exhaustive chlorination of thiophene, that is, continual chlorination until the total weight of chlorinated products is no longer appreciably increased upon further chlorination. Exhaustive chlorination is preferred, since this operation tends to give the highest yields of the new compound. With other reaction conditions remaining constant, lower yields in decreasing amounts are obtained as the ratio of chlorine to thiophene is reduced. When the molar ratio of chlorine to thiophene falls below about 5:1, little or none of the desired compound of this invention is obtained. Accordingly, the chlorination process to be employed herein does not contemplate the use of a reaction mixture containing a molar ratio of chlorine to thiophene of less than about 5:1.

The chlorination reaction of the present invention will generally be carried out at a temperature between about 20° C. and about 200° C. and preferably at a temperature between about 40° C. and about 160° C. It is an essential feature of this invention, as will be shown hereinafter, that the chlorination be carried out at a temperature below about 200° C. At temperatures in excess of 200° C., no heptachlorothiolane is present in the chlorinated reaction mixture. As the chlorination reaction proceeds upon addition of gaseous chlorine to thiophene, the temperature of the reaction mixture rises. The rate at which chlorine is added to thiophene will be such as to maintain a reaction mixture below about 200° C. and preferably in the range of 40° C. to 160° C. At temperatures between about 160° C. and about 200° C., comparatively small yields of the desired product are obtained so that while the operable temperature for the process of this invention is below about 200° C., the preferred range is between about 40° C. and 160° C.

The method of the present invention, accordingly, comprises chlorinating thiophene at a temperature of less than 200° C., preferably between about 40° C. and about 160° C., to a point where the molar ratio of chlorine to thiophene is at least 5:1, and thereafter fractionating the resulting mixture to yield heptachlorothiolane as a new composition of matter. In addition to thiophene, it is also contemplated that chlorothiophenes and, in particular, trichlorothiophene, may undergo addition of chlorine to yield heptachlorothiolane.

Heptachlorothiolane obtained by the above-described procedure is a colorless viscous liquid having a freezing point of 14.6° C. and a boiling point of 130–130.5° C. at a pressure of 4 millimeters of mercury. The new compound has a refractive index of $N_D^{20}$ 1.5849. It is readily soluble in common organic solvents and is characterized by the molecular formula $C_4HCl_7S$. Heptachlorothiolane obtained by the above-described process had the following analysis:

|  | Calculated for $C_4HCl_7S$ | Found |
|---|---|---|
| Carbon | 14.59 | 14.69 |
| Hydrogen | 0.31 | 0.46 |
| Chlorine | 75.37 | 75.38 |
| Sulfur | 9.74 | 10.10 |

An infrared absorption spectra study of the compound showed that it had lost all characteristics of thiophene and that there was no olefinic linkage present. Further evidence of the structure of heptachlorothiolane was shown by the method of its synthesis from thiophene, which indicated that a heterocyclic ring of 4 carbons and 1 sulfur was apparent. This was confirmed by the infrared absorption spectrograms, which revealed a structure similar to that of thiolane. The thiolane ring structure, the boiling point, and the elemental analysis taken together definitely establish the molecular formula of the new compound to be $C_4HCl_7S$.

The following illustrative and comparative examples will further serve to illustrate the chlorination process of this invention.

*Example 1*

To 168 grams of thiophene (2 moles) were added 15 moles of chlorine. The first 11 moles of chlorine were added at a rate of 3.34 moles per hour over a period of 3 hours and 18 minutes. The last 4 moles of chlorine were added at a rate of 0.269 mole per hour over a period of 14 hours and 50 minutes. The temperature of the mixture was kept at 70° C.±5° C. during addition of the chlorine. The crude reaction mixture was distilled directly under reduced pressure. There were obtained 17.9 grams of trichlorothiophene, 38.6 grams of tetrachlorothiophene, 449.9 grams of chlorine addition products of thiophene, and 8.5 grams of residue. The fraction of the chlorine addition products boiling in the range of 127–130.5° C. at a pressure of 4 millimeters of mercury yielded 29.3 grams of a product which was identified as crude heptachlorothiolane. Purification of this product was achieved by recrystallization from petroleum ether. The resulting product then had a freezing point of 14.6° C., a boiling point of 130–130.5° C. at a pressure of 4 millimeters of mercury, and was characterized by the refractive index and elemental analysis set forth above.

*Example 2*

Chlorination of thiophene was conducted in the same manner as that described in the preceding example, the only difference being the temperature at which the reaction mixture was maintained during chlorination. The first 5 moles of chlorine were added at a rate of 3.34 moles per hour while the temperature was maintained at 70° C.±5° C. The next 6 moles of chlorine were added at the rate of 3.34 moles per hour while the mixture was kept at reflux temperature, which rose from 70° C. to 193° C. during this period. The last 4 moles of chlorine were added at a rate of 0.276 mole per hour while the mixture was kept at the reflux temperature, which rose from 193° C. to 205° C. during this period. The crude resulting reaction product mixture was distilled directly under reduced pressure. There were obtained, upon distillation, 45.8 grams of dichlorothiophene, 112.6 grams of trichlorothiophene, 203.7 grams of tetrachlorothiophene, 15.3 grams of higher boiling material, and 9.8 grams of residue. No heptachlorothiolane was obtained, showing that the higher temperatures in excess of 200° C. are definitely unfavorable to the formation of heptachlorothiolane and, in fact, either prevent formation of this compound or decompose any heptachlorothiolane which might be formed during chlorination.

We claim:

1. The process for producing heptachlorothiolane, which comprises contacting thiophene with chlorine at a temperature below about 200° C. to a point where the molar ratio of chlorine to thiophene is at least about 5:1, fractionally distilling the resulting mixture under reduced pressure and collecting the product having a boiling point corresponding to 130–130.5° C. at a pressure of 4 millimeters of mercury.

2. The process for producing heptachlorothiolane, which comprises exhaustively chlorinating thiophene at a temperature below about 200° C., fractionally distilling the resulting mixture under reduced pressure and collecting the product having a boiling point corresponding to 130–130.5° C. at a pressure of 4 millimeters of mercury.

3. The process for producing heptachlorothiolane, which comprises exhaustively chlorinating thiophene at a temperature between about 40° C. and about 160° C., fractionally distilling the resulting mixture under reduced pressure and collecting the product having a boiling point corresponding to 130–130.5° C. at a pressure of 4 millimeters of mercury.

4. The process for producing heptachlorothiolane, which comprises chlorinating thiophene at a temperature between about 40° C. and about 160° C. to a point where the molar ratio of chlorine to thiophene is at least 5:1, fractionally distilling the resulting mixture under reduced pressure and collecting the product having a boiling point corresponding to 130–130.5° C. at a pressure of 4 millimeters of mercury.

5. The process which comprises exhaustively chlorinating thiophene at a temperature below about 200° C. and thereafter fractionally distilling the chlorinated mixture to separate therefrom a product of heptachlorothiolane characterized by the molecular formula $C_4HCl_7S$ and a freezing point of 14.6° C.

6. The process which comprises chlorinating thiophene at a temperature between about 40° C. and about 160° C. to a point where the molar ratio of chlorine to thiophene is at least 5:1 and thereafter fractionally distilling the chlorinated mixture to separate therefrom a product of heptachlorothiolane characterized by the molecular formula $C_4HCl_7S$ and a freezing point of 14.6° C.

7. As a new composition of matter, heptachlorothiolane, having the following characteristics:

Molecular formula _____ $C_4HCl_7S$
Freezing point _____ 14.6° C.
Boiling point at 4 mm. Hg _____ 130–130.5° C.
Refractive index $N_D^{20}$ _____ 1.5849

HARRY L. COONRADT.
HOWARD D. HARTOUGH.

REFERENCES CITED

The following references are of record in the file of this patent:

Willgerodt, J. fur Praktische Chemie, 33, 150–151 (1886).

Steinkopf, Ann., 532, 280 (1937).